United States Patent [19]

Eng

[11] Patent Number: 5,050,377
[45] Date of Patent: Sep. 24, 1991

[54] EXHAUST EMISSION CONTROL APPARATUS

[75] Inventor: Joseph W. Eng, 216-27 31st Rd., Bayside, N.Y. 11360

[73] Assignee: Joseph W. Eng, Bayside, N.Y.

[21] Appl. No.: 472,960

[22] Filed: Jan. 31, 1990

[51] Int. Cl.[5] .......................... F01N 3/02; F01N 3/26
[52] U.S. Cl. ....................................... 60/275; 55/127; 55/135; 55/276; 55/DIG. 30; 60/297; 60/303; 422/169; 422/174
[58] Field of Search ................ 60/275, 311, 297, 303; 55/127, 129, 135, 276, DIG. 30; 422/169, 174

[56] References Cited

U.S. PATENT DOCUMENTS

| | | | |
|---|---|---|---|
| 3,440,800 | 4/1969 | Jaschin | 60/275 |
| 3,526,081 | 9/1970 | Kusters | 60/275 |
| 3,835,645 | 9/1974 | Zoleta | 60/275 |

Primary Examiner—Douglas Hart
Attorney, Agent, or Firm—Levisohn, Lerner & Berger

[57] ABSTRACT

An exhaust emission control apparatus for treating the exhaust of an internal combustion engine by a combined electrostatic force and cyclone centrifugal force acting together to remove solid particulates. Electrostatically generated ozone reacts with the exhaust gases to reduce them to Co and to oxidize them to harmless gases. Exhaust enters a cyclone chamber, passing through an electrode having many small pointed openings. Air is injected into the cyclone chamber to create a centrifugal flow of the air and exhaust. The electrode charges the solid particulate in the exhaust which then move toward the outer boundary of the cyclone chamber and toward a solid particulate collector. Ozone is generated near the electrode for reacting with the exhaust gases. The air and exhaust gases in the cyclone chamber are ionized in the cyclone chamber and react as the exhaust flows through the cyclone chamber and the muffler chamber to deodorize and purify the exhaust. The exhaust control apparatus includes a muffler chamber concentrically surrounding a cyclone chamber which concentrically surrounds an exhaust inlet pipe.

5 Claims, 2 Drawing Sheets

EXHAUST EMISSION CONTROL APPARATUS

FIELD OF THE INVENTION

This invention relates to a low cost physical realizable pollution control apparatus for engine exhaust, and more particularly to an apparatus for minimizing or removing obnoxious odor, pollutants, such as soot and other solid particles, carbon monoxide, and nuisance exhaust noise from diesel engine exhaust.

BACKGROUND OF THE INVENTION

Prior exhaust control apparatuses have included particulate traps and electrical filters. U.S. Pat. No. 4,478,613 discloses an apparatus for removing solid particles from the exhaust of an internal combustion engine by charging the solid particles and aerosols of the exhaust in an electrostatic field generated by electrostatic spray disks. The solid particles adhere together and flow into a mechanical separator for removal from the exhaust.

U.S. Pat. No. 4,098,578 discloses an apparatus for treating gas exhaust generated by an internal combustion engine using cyclone action to mix the exhaust with other fluids in an enclosed chamber while subjecting the mixture to a rotating interrupted high voltage d.c. electric field sweeping through the mixture.

U.S. Pat. No 4,074,975 discloses a combination muffler and exhaust cleaner including a centrifugal separator.

U.S. Pat. No. 3,976,448 discloses an apparatus for removing particulate and odors from gases. High electrostatic and intensive sonic forces are simultaneously imparted to the gases while baffling the flow.

SUMMARY OF THE INVENTION

It is an object of the invention to provide an inexpensive exhaust control apparatus for eliminating noise, pollutants and odors from the exhaust of a diesel engine in a compact single unit structure.

It is another object of the invention to provide a exhaust control apparatus which utilizes the combined forces of electrostatic charges and cyclone disturbances to separate the solid particulate from the exhaust gases.

It is another objective of this invention to provide an exhaust control apparatus which utilizes combined electrostatic charges, oxygen and ozone to eliminate exhaust odors.

It is another object of this invention to provide an exhaust control apparatus having a long gas flow path to provide a longer reaction time in processing the exhaust.

It is another object of this invention to provide an exhaust control apparatus having a muffler chamber made of cylindrical sound absorbing material concentrically surrounding a cyclone chamber for effectively damping the exhaust noise.

It is another object of this invention to provide an exhaust control apparatus having air jets for taking oxygen into the apparatus, increasing the swirling centrifugal forces exerted on the exhaust and increasing the oxidating effect on the carbon monoxide gases.

It is another object of this invention to provide an exhaust control apparatus having a heating element in the soot collector for burning the soot so as to reduce it to a gaseous element, $CO_2$.

These and other objects of the invention are provided by an exhaust control apparatus including.

an exhaust inlet tube for receiving the exhaust generated by an internal combustion engine;

a cyclone barrier concentrically surrounding the exhaust inlet tube defining a cyclone chamber in the area between the cyclone barrier and the exhaust inlet tube;

a muffling barrier comprised of sound absorbing material and concentrically surrounding said cyclone barrier to define a muffler chamber between the muffler barrier and cyclone barrier;

means for increasing the exhaust flow path in the muffler chamber;

means for directing the exhaust from the exhaust inlet tube to the cyclone chamber;

means for injecting air and creating centrifugal flow within the cyclone chamber;

means for collecting solid particulates, said collecting means positioned in the exhaust flow path between the cyclone chamber and the muffler chamber;

electrostatic charging means through which the exhaust passes for generating a region in the cyclone chamber where the solid particulate are charged, the air is ionized, and ozone is generated;

wherein the ionized air and ozone react with the gases in the exhaust to substantially to deodorize and purify the exhaust; and wherein the centrifugal flow in the cyclone chamber and the increased flow path in the muffler chamber enable a long reaction time for treating the exhaust and for returning the ozone to oxygen.

DETAILED DESCRIPTION OF THE PREFERRED EMBODIMENTS

Figure 2:
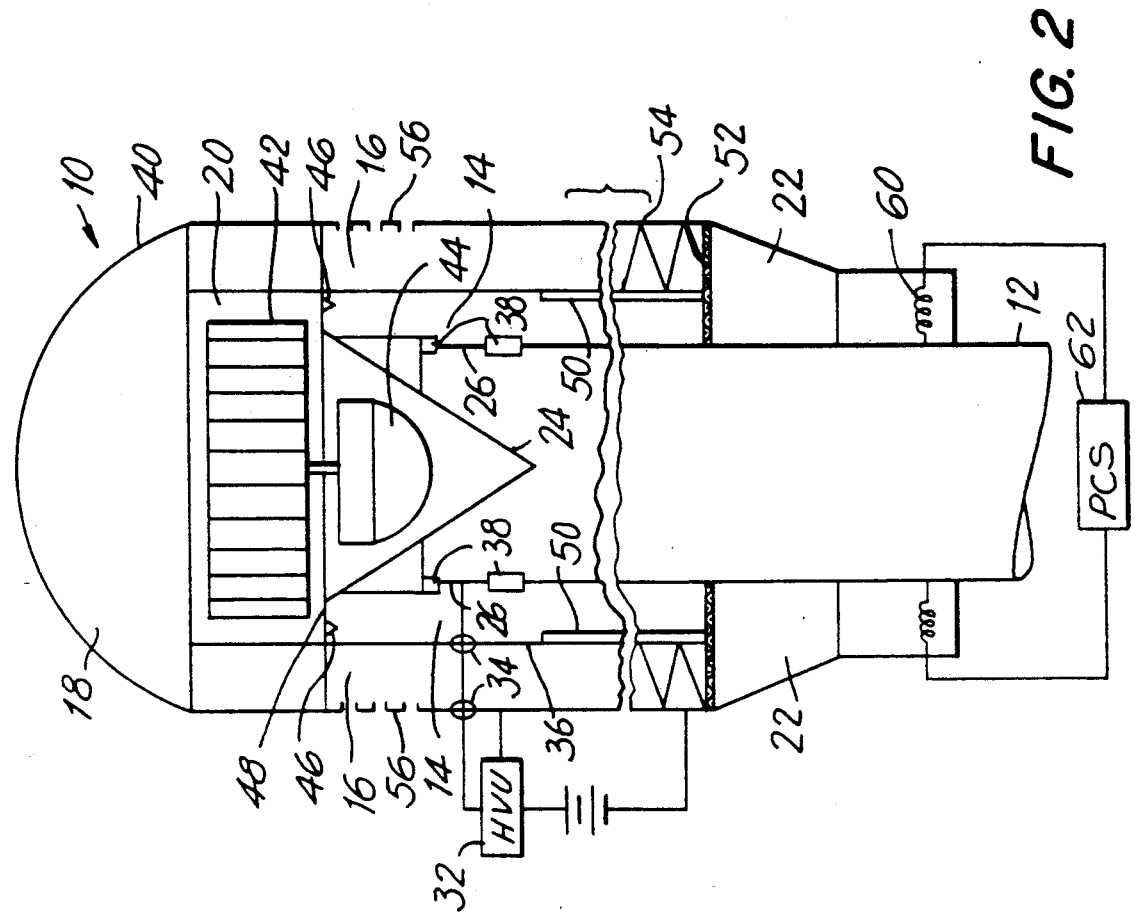
FIG. 2 is a cutaway view of an embodiment of the exhaust control apparatus of this invention.
Figure 1:
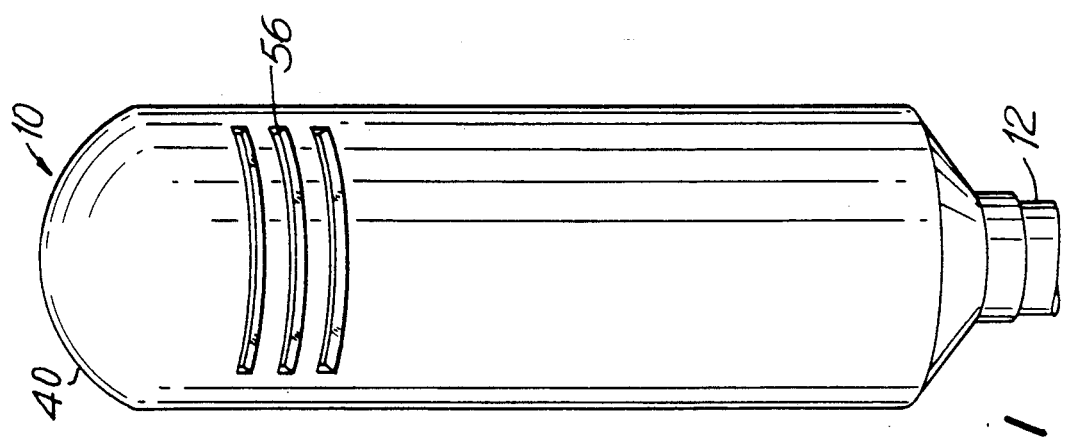
FIG. 1 is a perspective view of an embodiment of the exhaust control apparatus of this invention.

Referring to FIGS. 1 and 2, the exhaust control apparatus 10 includes an exhaust inlet pipe 12, a cyclone chamber 14, a muffler chamber 16, an air inlet chamber 18, an air pressurizing chamber 20, and a solid particulate collector bin 22. The outer wall of apparatus 10 is made of sound absorbing composite materials.

Hot diesel exhaust under pressure enters the apparatus 10 through the inlet pipe 12. At the end of the inlet pipe 12 a conical deflector 24 deflects the exhaust through an electrode assembly 26 into the cyclone chamber 14.

Figure 3:
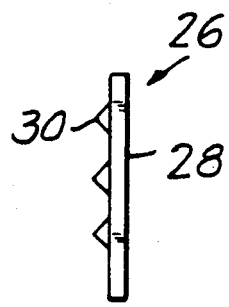
FIG. 3 is a side view of the electrode assembly showing a few of the thousands of tiny pointed openings for use in an embodiment of the exhaust control apparatus of this invention.
Figure 4:
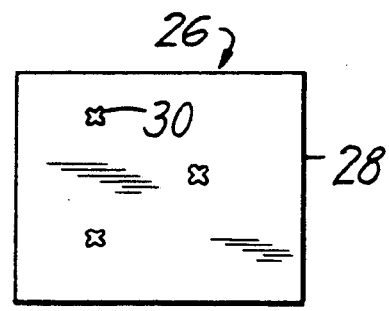
FIG. 4 is a front view of the electrode assembly of FIG. 3.

The electrode assembly 26, as partially shown in FIGS. 3 and 4, includes a barrier 28 having thousands of small pointed openings 30. The electrode assembly 26 is isolated from adjacent surfaces by insulators 38. A high voltage unit 32 is connected to the electrode assembly 26 through isolation grommets 34. A collecting electrode is formed by the inner wall 36 of the exhaust control apparatus 10. Connecting the high voltage unit 32 between the electrode assembly 26 and the collecting electrode causes the air in the cyclone chamber near the electrode assembly 26 to be ionized and causes ozone, $O_3$, to be generated at the pointed openings 30 of the electrode assembly 26. The ionized gas and ozone form a cylindric zone in the cyclone chamber which the exhaust passes through. As the solid particulate in the exhaust pass through the openings 30, they become charged. As the odorous gases of the exhaust pass through the cylindric zone, they become neutralized by the ionized air and ozone. The carbon monoxide exhaust is oxidized to form carbon dioxide by reacting and with the ozone and with oxygen which enters the apparatus at air inlet chamber 18.

Figure 5:
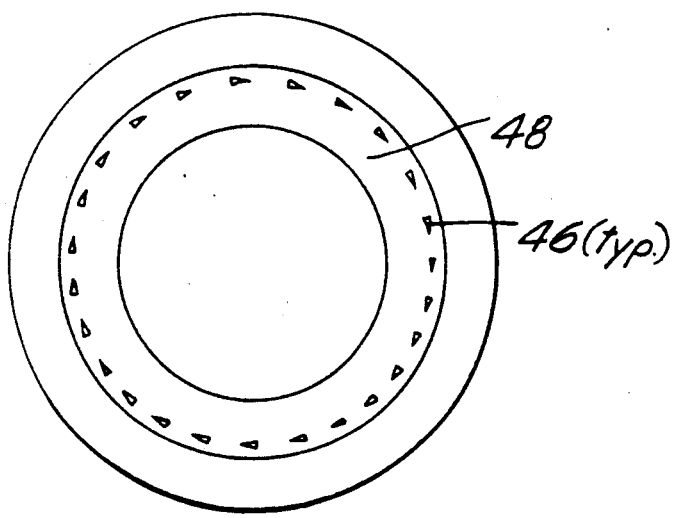
FIG. 5 is a plane view of the supporting plate with annular openings for providing air jets for pushing the exhaust around the cyclone chamber.

In the cyclone chamber 14, a swirling centrifugal force acts on the exhaust. The exhaust enters the cyclone chamber 14 through the electrode assembly 26 as discussed. Air also enters the cyclone chamber 14. Air enters apparatus 10 at air inlet chamber 18 through a screened dome 40. The air passes into an air pressurizing chamber 20 where a blower impeller 42 driven by an electric motor 44 pressurizes the air. The air under pressure is forced into the cyclone chamber 14 through an annular ring of openings 46 shaped to bias a centrifugal air flow in the cyclone chamber 14. Referring to FIG. 5, the openings 46 are shown in a supporting plate 48 which separates the air pressurizing chamber 20 from both the cyclone chamber 14 and the muffler chamber 16. Preferably, the openings 46 are angled toward the outer wall of the cyclone chamber 14 so as to further a centrifugal swirling motion of the air and exhaust gases in the cyclone chambers.

The pressurized air entering the cyclone chamber 14 through the openings 46 serve as air jets for increasing the centrifugal force pushing the exhaust gases around the cyclone chamber at an added velocity resulting in a greater dwell time. By increasing the time the gases dwell in the cyclone chamber neutralization of the gases can occur within a smaller area.

The centrifugal action in the cyclone chamber along with the electrostatic forces separate the charged solid particulate from the exhaust gases. The combined electrostatic force and centrifugal force work together to produce neutralization and separation more effectively than the two forces acting separately. The solid particulate are forced toward the outer wall of the cyclone chamber 14 and move along vertical ribs 50 through a screen 52 into the solid particulate collector bin 22.

Figure 6:
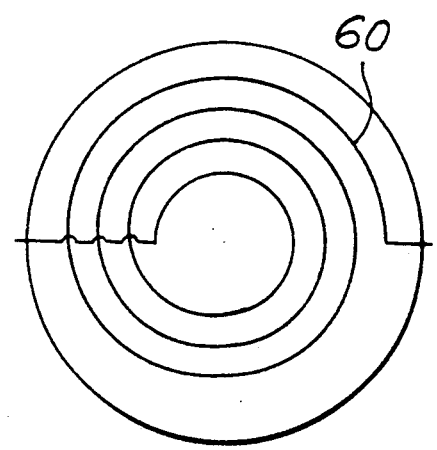
FIG. 6 is a plane view of the heating element in the soot collector for burning the collected soot.

At the bottom of the solid particulate collector 22 is a heating element 60 supported by an electrical and thermal insulating support (not shown). Referring to FIG. 6, the heating element 60 is shown as a coiled element. A power control source 62 controls the heating element 60 to energize the element at various intervals for burning the solid particulate to reduce the matter into a gaseous element, i.e., $CO_2$. This reduces maintenance and can be initiated either manually or automatically.

Gaseous pollutants, such as carbon monoxide, CO and obnoxious odorous gases, are oxidized and neutralized by the ozone, oxygen, and the electrostatic charges. The carbon monoxide, CO becomes carbon dioxide, $CO_2$. The obnoxious odor loses it offending characteristic by oxidation and the electrostatic charge influences which alter the charge distribution. The internally generated ozone effectively deodorizes the odorous exhaust gases.

Clean purified exhaust steam remains which then reverses its direction and turns through a spiral portion 54, in the muffler chamber 16. This spiral portion increases the exhaust flow path. At the top of the muffler chamber 16 clean exhaust is released into the atmosphere through the screen outlet 56. An extra long gas flow path is created by the cyclone action and the physical spiral providing this apparatus with more reaction time than prior pollution control devices. Further, the use of multiple chambers provides a sound damping effect which muffles the exhaust noise.

The long flow path in the cyclone chamber and the outer muffler chamber combined with a sound absorbing outer wall of apparatus 10 contribute to the reduction of exhaust noise and thus serve as an exhaust muffler. In addition to the reduction of exhaust noise, the dual chamber design greatly increases the flow path length also. This increase in path length enables the ozone to oxidize the odor thoroughly and allows a required time for the ozone to disintegrate back to $O_2$ so as not to cause any harmful effect to human or animal life near the exhaust area.

Although a preferred embodiment of the invention has been described and illustrated, modifications may be made without departing from the invention. The invention is intended to be interpreted based on the claims, in light of the prior art.

I claim:

1. An exhaust control apparatus for muffling noise and treating odors and pollutants, including solid particulate and gases in the exhaust of an internal combustion engine, comprising an exhaust inlet tube for receiving the exhaust generated by an internal combustion engine;

a cyclone barrier concentrically surrounding the exhaust inlet tube, a ring cavity between the cyclone tube and exhaust inlet tube defining a cyclone chamber in which the exhaust is treated;

means for directing the exhaust from the exhaust inlet tube into the cyclone chamber;

electrode means having a plurality of small openings through which the exhaust passes to enter the cyclone chamber, the electrode means generating electrostatic forces which charge the solid particulate in the exhaust, ionize air and generate ozone in the cyclone chamber near the electrode;

means for injecting air into the cyclone chamber causing centrifugal flow of the air and the exhaust within the cyclone chamber and increasing a dwell time of the exhaust within the cyclone chamber;

wherein the centrifugal flow forces the solid particulate toward the outer boundary of the cyclone chamber, wherein odorous gases in the exhaust are neutralized in the cyclone chamber by reacting with the ozone, ionized air and an oxygen component of the air injected into the cyclone chamber, and wherein other gases are oxidized to form exhaust output gases;

means for collecting solid particulate separated from the exhaust in the cyclone chamber and through which the exhaust from the cyclone chamber passes to enter a muffler chamber concentrically surrounding the cyclone chamber;

an outer wall comprised of a sound damping material concentrically surrounding the cyclone chamber and defining the muffler chamber between the outer wall and the cyclone barrier, the outer wall also defining an opening through which treated exhaust exits the exhaust control apparatus;

means for increasing the flow path of the exhaust in the muffler chamber;

wherein the centrifugal flow in the cyclone chamber and the increased flow path in the muffler chamber enable a reaction time for oxidizing and deodorizing the exhaust and for returning the ozone to oxygen.

2. The apparatus of claim 1 in which the cyclone barrier comprises vertical ribs within the cyclone chamber for guiding the solid particulate into the collecting means.

3. The apparatus of claim 1 wherein the means for injecting comprises an impeller and a barrier, the barrier having biased openings along a portion adjacent to the cyclone chamber and defining an air inlet chamber and an air pressurizing chamber; wherein the impeller is positioned within the air pressurizing chamber for pressurizing air received from the air inlet chamber and for forcing pressurized air through the biased openings, the biased openings being angled to create air jets for creating centrifugal flow within the cyclone chamber toward the collecting means.

4. The apparatus of claim 1 further comprising a means for burning the solid particulate collected at the solid particulate collecting means.

5. An exhaust control apparatus for muffling noise and treating odors and pollutants, including solid particulate and gases, in the exhaust of an internal combustion engine, comprising:

an exhaust inlet tube for receiving the exhaust generated by an internal combustion engine;

a cyclone barrier concentrically surrounding the exhaust inlet tube and defining a cyclone chamber;

a muffling barrier comprised of sound absorbing material concentrically surrounding said cyclone barrier to define a muffler chamber between the muffler barrier and cyclone barrier;

means for increasing the exhaust flow path within the muffler chamber;

means for directing the exhaust from the exhaust inlet tube to the cyclone chamber;

means for injecting air and creating centrifugal flow within the cyclone chamber;

means for collecting solid particulate positioned in the exhaust flow path between the cyclone chamber and muffler chamber;

electrostatic charging means through which the exhaust passes for generating a region in the cyclone chamber where the solid particulate are charged, the air is ionized, and ozone is generated;

wherein the ionized air and ozone react with the gases in the exhaust to substantially deodorize and purify the exhaust; and wherein the centrifugal flow in the cyclone chamber and the increased flow path in the muffler chamber enable a long reaction time for treating the exhaust and for returning the ozone to oxygen.

* * * * *